United States Patent Office 2,825,409
Patented Mar. 4, 1958

2,825,409

HYDRAULIC FRACTURING OF FORMATIONS

Kenneth A. Ring, Corpus Christi, Tex., assignor to Shell Development Company, New York, N. Y., a corporation of Delaware No Drawing. Application September 13, 1954
Serial No. 455,796

9 Claims. (Cl. 166—42)

This invention relates to a method of treating formations traversed by oil and gas wells to make them more permeable to the flow of fluids, and pertains more particularly to a fluid composition to be used in methods wherein the producing formation around a well is fractured by hydraulic pressure.

In many oil fields, the permeability of the producing formation is so low or the viscosity of the reservoir fluids so high that the drainage of hydrocarbons from said formation into the well borehole proceeds at a very slow rate. Various methods have been employed for increasing the rate of drainage of oil and gas into the borehole. During the past few years, one of the most successful methods for increasing the productivity of oil and gas wells has been the hydraulic fracturing of the producing formation.

In general, the method of hydraulic fracturing of producing formations comprises introducing into the well a high viscosity liquid such, for example, as an oil-containing gel or emulsion carrying or supporting a quantity of sand or other fine-grained insoluble material. This sand-containing fluid is pumped into the well opposite the producing zone and hydraulic pressure is applied thereto until fractures are produced in the formation adjacent the well, thereby opening up flow channels in the low-permeability hydrocarbon-producing formation to allow an increased drainage into the well. By forcing this high viscosity fluid, which may be in the form of a colloidal gel or emulsion, at a given rate into the formation, there is produced within the formation a pressure sufficient to fracture the formation and lift the effective overburden. The gel or emulsion is subsequently removed from the fractured producing zone by contacting it with a peptizing agent or a gel or emulsion breaker which converts the gel or emulsion to a less viscous fluid and permits it to flow or be readily flushed from the fractures and removed from the well. This method of hydraulic fracturing of formations is known to the trade under the registered trademark name of "Hydrafrac." This treatment is also effective in increasing the productivity of formations which have permeability sufficient to produce normally but which are blocked by invasion of water, mud, as mud filtrate which forms what is referred to as a "skin."

It is a primary object of this invention to provide an improved fluid composition for use in operations wherein formations adjacent an oil or gas well are hydraulically fractured, said fluid composition being in the form of a gel or emulsion capable of being broken in either shallow or deep wells without the injection thereinto of a gel or emulsion breaking agent or fluid.

Another object of this invention is to provide a method for hydraulically fracturing formations adjacent to the borehole by injecting thereinto an oil-base, sand-containing gel having a relatively low liquefaction temperature.

It is also an object of this invention to provide a method of utilizing available lease-tank crude oil as the sand carrying vehicle by gelling or emulsifying it to obtain the necessary sand suspension, viscosity, liquefaction, and fluid loss requirements. This would reduce treatment costs and prevent the possibility of damage to the formation by the injection of fluids foreign to the formations.

A further object of this invention is to provide a fluid composition for hydraulic fracturing operations in the form of a sand-carrying oil base gel, whose consistency and liquefaction temperature may be varied within wide limits depending upon well conditions or the depth of the well in which the fluid composition is injected.

These and other objects of this invention will be understood from the following description of the invention, which is predicated upon the discovery that an improved hydraulic fracturing fluid in the form of a high viscosity gel or emulsion may be prepared by dissolving in an oil, such as crude oil, diesel oil, stove oil, etc., a quantity of a soap or salt of tall oil. The alkali metal soaps of tall oil, such as sodium tallate are preferably employed in making the present gel. However, where gels of a higher melting point are desired, such as gels for use in deep wells, the alkaline earth metal soaps of tall oil may be used.

For economic reasons, the present hydraulic fracturing fluid consists predominantly of crude oil which is preferably obtained from the lease upon which the fracturing operations are to be conducted. To this crude oil, a prepared alkali metal soap of tall oil may be added in an amount sufficient to form a gel or emulsion of the desired consistency and viscosity. However, instead of using a prepared tall oil soap to form the gel, the soap may be formed either in or at the well at the time the sand carrying agent is being made.

A preferred method is to form the tall oil soap at the well location at the time the gel is formed by admixing with crude oil or kerosene an amount of tall oil equal to from 2% to 25% of the amount of the oil used. To this tall oil-crude oil mixture is added an isopropyl alcohol-sodium hydroxide solution. Upon agitation, the sodium hydroxide reacts with the tall oil to form sodium tallate which acts as a gel-forming agent to convert the isopropyl alcohol and crude oil into a high viscosity gel. Subsequently, a suitable propping agent, such as sand or crushed oyster shells or the like, may be added to the gel in an amount equal to from ½ to 10 pounds per gallon of gel.

The viscosity and hence the sand-carrying capacity of the gel can be regulated by varying the amounts of tall oil and/or the sodium hydroxide-isopropyl alcohol solution added. A substantially concentrated solution of sodium hydroxide and alcohol is preferably used, that is, one comprising about 0.15 pound of sodium hydroxide per gallon of isopropyl alcohol, which improves the gel formation.

By premixing the tall oil and crude oil and then forming the soap of tall oil, an excellent hydraulic fracturing fluid is readily formed as a gel, thus obviating the difficulties normally encountered in thoroughly mixing suitable quantities of a previously prepared tall oil soap with crude oil until a gel structure is formed.

As an alternative to mixing a caustic soda-isopropyl alcohol solution with the tall oil to form a soap, an emulsion of the present invention can also be made by admixing a suitable quantity of tall oil to the crude oil and then adding to this mixture a substantially concentrated aqueous solution of sodium hydroxide. The mixture is agitated until the high viscosity emulsion is formed, after which the necessary sand, such as Ottawa sand, is added. It may be seen that by using mixtures of varying percentages of isopropyl alcohol and water or salt water in which to dissolve the sodium hydroxide, hydraulic fracturing emulsions of different characteristics may be obtained, as the water introduced lowers the consistency and the liquefaction temperature of the gel.

To illustrate the effect of the present invention on the operation of a well in the Big Foot field in Texas, the following example may be given.

The well, which on a production test before being treated, would have produced from 7 to 15 barrels of oil per day by pumping, was 3200 feet deep and had a bottom hole temperature of 132° F. The borehole was drilled to the top of the oil sand and a casing string was set and cemented at that point. Drilling was then continued so that the borehole extended through the oil sand. A small diameter tubing string with or without a packer near the lower end thereof was run into the well and the packer was expanded against the walls of the borehole. 3580 gallons of hydraulic fracturing gel, which included 16,000 pounds of sand, were made up by adding about 2000 pounds by weight of tall oil to approximately 2000 gallons of crude oil previously obtained from the lease well. The tall oil and crude oil were thoroughly mixed at the well site after which about 1000 gallons of a saturated solution of sodium hydroxide in isopropyl alcohol were added. Agitation of the entire batch of gel was continued until the gel had reached the desired viscosity.

Prior to the formation of the sodium tallate soap in the crude oil and alcohol mixture, the mixture has no sand suspension power; however, after the formation of the sodium tallate soap in the oil-alcohol mixture, the mixture has a gel strength sufficient to suspend 4 to 5 pounds of sand per gallon of gel under static conditions. Preferably, 30 to 40 mesh sand is used. Hardly any agitation is needed to mix the tall oil with the crude oil or to mix the alcohol-sodium hydroxide solution into the oil mixture. However, when fairly large amounts of sand, say 5 pounds per gallon of gel, are used in the gel, the entire mixture must be kept rolling in the tank after the sand has been added to counteract any tendency of a portion of the sand to drop out of the gel. The hydraulic fracturing gel was mixed in 2000 gallon batches using about 10 barrels of saturated sodium hydroxide-alcohol solution, which amount was required in view of the low solubility of sodium hydroxide in alcohol. After six or seven barrels of the sodium hydroxide-alcohol solution had been added, the gel formed as the sodium tallate soap was formed in the mixture.

In treating the well, 30 to 40 barrels of oil were first pumped down the tubing string; however, this is only a method of insuring that the formation will break down before starting the gel down the tubing and is not necessary to the practice of the present invention. This oil was followed by 3580 gallons of gel admixed with sand. An additional 90 barrels of oil were then pumped down the tubing string as an over-flush following the gel-sand mixture; however, this step is not necessary and can be eliminated if desired. When the gel-sand mixture reached the producing formation, a substantial increase in pump pressure at the surface was noted as the high viscosity gel-sand mixture was being forced into the formation. The pump pressure rose until a rather abrupt break in the pressure vs. pump rate curve indicated that a formation fracture had taken place. Pumping was continued until all of the gel-sand mixture had been forced into the formation. The fracturing gel was left in the formation for a period of 3½ to 4 hours, after which the well was put into production and flowed 83 barrels per day of oil through a ⅛" choke.

The present tallate oil gel differs from most hydraulic fracturing gels or emulsions presently used in that no acid, gel breaker, or other chemical need be pumped down into the well following the fracturing gell to break the gel and thus facilitate the flow of fluids from the formation into the borehole. In addition, no breaker agent is included in the mixture. The present fracturing gel is readily broken in the formation by the temperature of the formation and/or any formation water or oil which may become admixed with the gel. Thus, the expense and time consumed in injecting a gel breaker into the formation subsequent to its fracture are eliminated. After the gel has been broken, the sand stays in the formation and serves as a propping agent. It is to be realized, however, that the tallate gel of the present invention may be used in fracture formations without the inclusion of sand therein in the same manner as other non-sand carrying formation fracturing gel mixtures.

The presence of alcohol in the present gel serves two functions: that of a carrier to bring the sodium hydroxide in contact with tall oil, and that of a crude oil diluent allowing the gel to be broken at very low temperatures. In deeper wells where higher temperatures are encountered, smaller amounts of alcohol may be employed in the gel mixture, or some or all of the alcohol may be replaced with water or salt water which would form an emulsion.

The action of tall oil soaps in making superior gels for hydraulic fracturing operations is not entirely understood, but is believed to be in part due to the natural heterogeneity of tall oil which renders the material and its soaps particularly compatible with crude oil and introduces peptizers and reactive molecules in one composition. Tall oil may normally contain small amounts of high molecular weight alcohols, for example, cholesterol. The alcohols and other polar molecules in the tall oil are probably, in part, responsible for the ease in which a well-dispersed gel is obtained. These materials act as peptizers and at the same time are probably responsible for the relatively low liquefraction temperature of the resulting gel, whereby the gel is automatically broken in a well by the formation temperature, even in very shallow wells.

To further test the present hydraulic fracturing gel, two other wells in the same field were treated with the present gel. One well was treated with 2379 gallons of tallate gel including 9600 pounds of sand, while the other well was treated with 4000 gallons of gel including 16,000 pounds of sand. After treatment, these wells flowed 65 and 77 barrels per day, respectively, as compared to the 7 to 15 barrels per day of oil obtained by pumping untreated wells in this field.

The term tall oil as used in this specification and the appended claims, is meant to include all tall oil type soaps, for example, crude or refined tall oil, and the so-called "floating soap" which is formed as a by-product in the production of paper or other cellulose by the Kraft process. In the Kraft process, the so-called "floating soap" is contained in the so-called black liquor. Upon concentration of this black liquor, the "floating soap" separates to the surface and may be freed of any entrained black liquor by salting out, centrifuging, or the like. The "floating soap" as described above is used to produce the tall oil of commerce.

While isopropyl alcohol was used in the above examples, other water miscible alcohols, for example, tertiary butyl alcohol, may be used. In addition, acetone and lower molecular weight polyhydric alcohols, for example, diethylene glycol, may likewise be used.

I claim as my invention:

1. A method of increasing the productivity of a formation penetrated by a well by hydraulically fracturing the formation, said method comprising introducing into said well a fracturing medium consisting essentially of a predominant quantity of a low-viscosity hydrocarbon liquid and a gel-forming soap of tall oil, said soap being in sufficient amount when mixed with said liquid to produce a fracturing medium possessing a viscosity of at least about 120 centipoises, pumping said fracturing medium into a confined zone in said well adjacent said formation, increasing the pressure on said fracturing medium until a formation fracture is indicated, maintaining said fracturing medium in said fractured formation until the viscosity of said fracturing medium is substantially reduced by the formation temperature, and thereafter producing said well.

2. A method of increasing the productivity of an oil formation penetrated by a well comprising the steps of mixing at the well head a hydrocarbon liquid and a tall oil soap gelling agent for said liquid in sufficient proportions to form a gel which is capable of being forced into said formation, pumping this gel mixture into said well, forcing said mixture down said well, positioning said gel mixture in a confined zone adjacent said formation to be fractured, increasing the pressure on said gel until a formation fracture is indicated, continuing application of high pressure to force a portion of said gel into said fracture, maintaining said gel mixture in said fractured formation for a time sufficient for the formation temperature to break and reduce substantially the viscosity of said gel, and thereafter producing fluids from said well.

3. The method of claim 2, which includes the step of adding granular spacer material insoluble in well fluids with at least a portion of the liquid introduced into the well, whereby said spacer material may be carried by the gel mixture into the formation fracture and deposited in said fracture when the gel is broken.

4. The method according to claim 2 wherein said tall oil soap gelling agent is an alkali metal soap of tall oil.

5. A method of increasing the productivity of an oil formation penetrated by a well comprising the steps of mixing at the well head a hydrocarbon liquid and from about 2 to 25 percent by weight of tall oil, admixing with said hydrocarbon liquid and tall oil an alcohol-sodium hydroxide solution in an amount sufficient to form a gel which is capable of being forced into said formation, pumping this gel mixture into said well, forcing said mixture down said well, positioning said gel mixture in a confined zone adjacent said formation to be fractured, increasing the pressure on said gel until a formation fracture is indicated, continuing application of high pressure to force a portion of said gel into said fracture, maintaining said gel mixture in said fractured formation for a time sufficient for the formation temperature to break and reduce substantially the viscosity of said gel, and thereafter producing fluids from said well.

6. A method of increasing the productivity of an oil formation penetrated by a well comprising the steps of mixing at the well head a hydrocarbon liquid and from about 2 to 25 percent by weight of tall oil, admixing with said hydrocarbon liquid and tall oil an alcohol-sodium hydroxide solution in an amount sufficient to form an oil-tall soap gel which is capable of being forced into said formation, adding to the gel from about ½ to 7 pounds of 20 to 60 mesh sand per gallon of gel, pumping this gel mixture into said well, forcing said mixture down said well, positioning said gel mixture in a confined zone adjacent said formation to be fractured, increasing the pressure on said gel until a formation fracture is indicated, continuing application of high pressure to force a portion of said gel into said fracture, maintaining said gel mixture in said fractured formation for a time sufficient for the formation temperature to break and reduce substantially the viscosity of said gel, and thereafter producing fluids from said well.

7. A method increasing the productivity of a formation penetrated by a well by hydraulically fracturing the formation, said method comprising introducing into said well a fracturing medium containing as essential constituents a predominant quantity of a low-viscosity hydrocarbon liquid and a gel-forming soap of tall oil, said soap being in sufficient amount when mixed with said liquid to produce a fracturing medium possessing a gel strength sufficient to suspend particles of sand therein, adding to the gel from about ½ to 7 pounds of sand per gallon of gel, pumping said fracturing medium into a confined zone in said well adjacent said formation, increasing the pressure on said fracturing medium until a formation fracture is indicated, maintaining said fracturing medium in said fractured formation until the viscosity of said fracturing medium is substantially reduced by the formation temperature, and thereafter producing said well.

8. A method of increasing the productivity of an oil formation penetrated by a well comprising the steps of mixing at the well head a predominant amount of crude oil and a minor amount of tall oil, admixing with said crude oil-tall oil mixture a substantially saturated solution of sodium hydroxide in an amount sufficient to convert the tall oil to its sodium soap and form an emulsion which is capable of being forced into said formation, adding to the emulsion from about ½ to 7 pounds of sand per gallon, pumping this emulsion mixture into said well, forcing said mixture down said well, positioning said emulsion mixture in a confined zone adjacent said formation to be fractured, increasing the pressure on said emulsion until a formation fracture is indicated, continuing application of high pressure to force a portion of said emulsion into said fracture, maintaining said emulsion mixture in said fractured formation for a time sufficient for the formation temperature to break and reduce substantially the viscosity of said emulsion, and thereafter producing fluids from said well.

9. A method increasing the productivity of a formation penetrated by a well by hydraulically fracturing the formation, said method comprising introducing into said well a fracturing medium containing as essential constituents a predominant quantity of crude oil and a gel-forming alkali metal soap of tall oil, said soap being in sufficient amount when mixed with said liquid to produce a fracturing medium possessing gel strength sufficient to suspend particles of sand therein, adding to said gel from ½ to 7 pounds of sand per gallon of gel, pumping said fracturing medium into a confined zone in said well adjacent said formation, increasing the pressure on said fracturing medium until a formation fracture is indicated, maintaining said fracturing medium in said fractured formation until the viscosity of said fracturing medium is substantially reduced by the formation temperature, and thereafter producing said well.

References Cited in the file of this patent

UNITED STATES PATENTS

| 2,596,844 | Clark | May 13, 1952 |
| 2,667,457 | McChrystal | Jan. 26, 1954 |
| 2,672,936 | Bond | Mar. 23, 1954 |
| 2,675,352 | Dawson | Apr. 13, 1954 |
| 2,724,439 | Brainerd | Nov. 22, 1955 |